March 3, 1953          E. R. ALLER          2,629,899

METHOD OF SMOOTHING AND SHAPING CELLULAR POLYSTYRENE

Filed Oct. 13, 1949

INVENTOR.
Edmund R. Aller
BY George I. Haight
George H. Simmons
ATTORNEYS

Patented Mar. 3, 1953

2,629,899

UNITED STATES PATENT OFFICE 2,629,899

METHOD OF SMOOTHING AND SHAPING CELLULAR POLYSTYRENE

Edmund R. Aller, Ogden Dunes, Ind., assignor to General American Transportation Corporation, Chicago, Ill., a corporation of New York Application October 13, 1949, Serial No. 121,194

3 Claims. (Cl. 18—48)

This invention relates to a method of forming smooth surfaces on a slab of cellular synthetic plastic material, and has for its principal object the provision of a new and improved method of this kind.

It is a main object of the invention to provide a method of forming, on a slab of cellular synthetic plastic material, surfaces which are sufficiently smooth and non-porous to efficiently receive an adhesive by which the slab is secured either to another slab or to a dissimilar material.

Another object of the invention is to provide a method of forming parallel planar surfaces on a slab of cellular synthetic plastic material, which surfaces are spaced apart a desired distance throughout the slab.

Another object of the invention is to provide a method of smoothing the surfaces of a slab of cellular synthetic plastic material rapidly and economically through the use of simple machinery that is inexpensive to build, operate and maintain.

Further objects of the invention not specifically mentioned here will be apparent from the detailed description and claims which follow, reference being had to the accompanying drawings in which a preferred embodiment of the invention is shown by way of example and in which:

Figure 1:
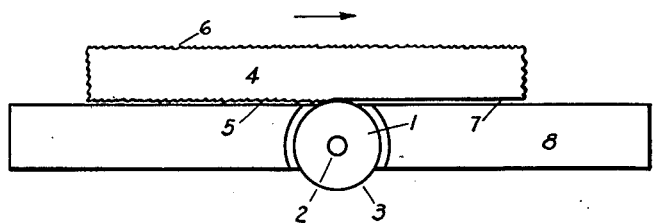
Fig. 1 is a diagrammatic view illustrating the invention.

Cellular synthetic plastic materials having a low co-efficient of thermal conductivity form efficient thermal insulation in instances where low temperatures are involved. Thus, for example, a slab of foamed polystyrene lends itself well to insulating refrigerators, refrigerator cars and the like. In such uses a slab of foamed polystyrene, commonly called styrofoam, is placed between layers of material of fairly low thermal conductivity, such as wood or plywood, and secured to such material by a suitable adhesive to form a sandwich-like panel that can be used for thermal insulation.

Styrofoam is formed by an extruding process which releases the material suddenly from a zone of high pressure into a zone of low pressure thereby to permit gases entrapped in the material under pressure to expand it into a cellular slab. The slab so formed, while of approximately uniform dimensions, has relatively rough surfaces containing protuberances and low spots indiscriminately interspersed. Furthermore there are many pores of varying sizes opening into the surface. Such a surface does not lend itself well to the reception of an adhesive such as would be employed to secure the slab to a panel having flat planar surfaces such as, for example, a plywood panel. In addition, the thickness of such slabs merely approximates a desired dimension and if sandwiches were formed from the material in untreated condition, such sandwiches would vary appreciably in thickness and the formation of smooth planar walls therefrom would be exceedingly difficult.

Foamed synthetic plastics, such as for example styrofoam, when heated to melting point shrink rapidly in all directions and smoothing of the slabs by passing the same over heated rollers requires extremely accurate temperature control in order to produce satisfactory results. Such cellular material does not lend itself well to milling since the material, being highly cellular, will crawl ahead of a cutting tool unless that tool is exceedingly sharp and the surface after milling will be very nearly as irregular as before.

Foamed synthetic plastics that are not highly elastic are preferable for use in heat insulation. Certain of these materials, styrofoam for example, soften at a temperature somewhat lower than the melting point of the material, and when so softened flows quite freely. Styrofoam has a low coefficient of elasticity but it is not particularly brittle, and heat to soften it can be generated by friction without shattering protuberances in the material.

The present invention utilizes this softening and consequent flowing of the material to provide a method of shaping slabs of cellular synthetic plastic material to a desired shape and thickness and to finish on such slabs a smooth surface capable of efficiently receiving an adhesive by which the slab is secured to a panel.

In its preferred form the method of the present invention involves bringing the untreated slab into contact with a rapidly moving tool under pressure sufficient to cause friction between the tool and the slab to soften but not completely melt the material at the surface of the slab. This softening of the material causes it to flow and imparts to the surface a finish that is sufficiently smooth and is somewhat less cellular than the remainder of the material, which surface, when coated with a suitable adhesive, is capable of satisfactorily securing the slab to a panel to form a sandwich.

It has been found that by forming a generally cylindrical tool, the elements of which have the desired shape and by roughening the surface of that tool slightly, as by sandblasting or knurling, sufficient friction will be generated when the slab is brought into engagement with the tool and the tool revolves at a moderately high speed. The slab can be moved with respect to the tool at a uniform fairly high rate of speed to finish the surface of the slab economically. By providing duplicate tools mounted for rotation about parallel axes and having their working surfaces spaced apart a desired distance both surfaces of a slab can be finished and the slab milled to a desired thickness in a single operation.

Referring now to the drawings in more detail wherein the invention is diagrammatically illustrated as applied to the formation of a smooth planar surface on a slab of material, the tool 1 is shown to consist of a cylinder which is mounted for rotation around an axis 2 and has an outer surface 3 that is slightly roughened so as to generate appreciable friction when the tool engages the work. The axial length of the cylinder 1 is greater than the maximum width of the slabs that are to be milled with it and the speed at which it is rotated will depend upon the diameter of the cylinder. The cylinder may be formed or cast as desired and is preferably composed of mild steel.

A slab of cellular synthetic plastic material 4 is seen to contain irregular surfaces 5 and 6, one of which is smoothed as indicated at 7 as the slab is moved across the tool in the direction of the arrow. As will be readily apparent, friction between the tool and the protuberances in the slab will be greater than the friction between the tool and the material in the bottom of recesses in the slab. This friction generates heat sufficient to soften but not completely melt the material. On softening, the material contracts and eliminates or reduces the cells in the softened portion, and as a result the rough surface 5 flows together to form a finished surface 7 that is smooth enough for the purpose intended. In one instance with the tool 1 revolving at approximately 35000 R. P. M. slabs of styrofoam were finished to the desired smoothness by pushing them across the tool as rapidly as possible, the weight of the slab on the tool causing friction to generate sufficient heat for the purpose desired.

With the slab supported upon a suitable work table 8 contraction of the softened material will move it away from the tool 1 and friction between the tool and material will be lessened. Generation of heat decreases and excessive softening of the material is avoided even though the movement of the slab across the tool is at a rate much slower than necessary. When this rate of relative movement is maintained at a correct value, the softening of the material in the slab is confined to the surface of the slab and the resulting decrease in cellular structure is confined to the surface and the thermal characteristics of the slab are not materially affected.

Figure 2:
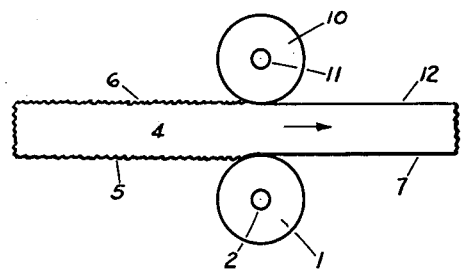
Fig. 2 is a diagrammatic view illustrating an arrangement for forming parallel planar surfaces on a slab.
Figure 3:
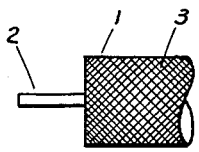
Fig. 3 is a fragmentary plan view of the tool.

In Fig. 2 a second roller 10, mounted for rotation about an axis 11 that is parallel to the axis 2, is spaced from the roller 1 so that upon engaging the upper surface 6 of the slab 4 simultaneously with the engagement of the lower roller with the surface 5 thereof, both surfaces will be smoothed as indicated at 7 and 12 and the slab 4 will be milled to a desired thickness.

By arranging the rollers to engage the edges rather than the faces of the slab the slab may be trued to desired dimensions in the same manner.

Softening of the material so as to cause it to flow into a comaratively smooth surface permits finishing the raw slab without materially reducing the mass thereof. The operation is not one of milling or grinding which removes all of the material beyond the finish surfaces, but rather the process involves moving the material that lies beyond a finish surface into that surface or into the body of the slab between the two face surfaces, and the loss of mass of the slab is minimized if not eliminated entirely.

From the foregoing it will be apparent that the method of the present invention permits smoothing the surfaces of a slab of cellular synthetic plastic material so as to prepare those surfaces to receive adhesives for bonding the slab to panels of materials. By suitably shaping the tools contours other than planar can be achieved in the same manner. The equipment required is economical to build, operate and maintain, and the process provides an economical method of finishing the relatively rough slab of raw material.

While I have chosen to illustrate my invention by showing and describing a preferred embodiment of it, I have done so by way of example only as there are many modifications and adaptations which can be made by one skilled in the art within the teachings of the invention.

Having thus complied with the statutes and shown and described an embodiment of my invention, what I consider new and desire to have protected by Letters Patent is pointed out in the appended claims.

What is claimed is:

1. The method of shaping a slab of foamed cellular polystyrene and finishing a surface thereon to receive an adhesive by which the material is secured to another piece of material which comprises: engaging the slab with a generally cylindrical tool the elements of which conform to the shape to be imparted to the slab; revolving the tool at a speed high enough to cause frictional heat sufficient only to soften the portions of the material that come in contact with the tool and insufficient to decompose the material, so that the tool can push the softened material into interstices in the unsoftened material immediately adjacent the surface without materially reducing the mass of said slab, and moving the slab with respect to the tool to generate the desired contour in the surface of the slab.

2. The method of smoothing and shaping a surface of a slab of foamed cellular polystyrene which comprises: engaging the slab with a tool shaped as an element of the desired contour; moving the tool with respect to the slab to generate frictional heat sufficient only to soften the portions of the material that come in contact with the tool and insufficient to decompose the material so that the tool can push the softened material into the pores and low spots in the slab, thereby to smooth the surface and impart the desired shape to an element of the surface without substantial reduction of the mass of said slab; and moving the slab with respect to the tool, thereby to form a surface of the slab to a desired shape.

3. The method of forming on a slab of foamed cellular polystyrene parallel planar faces spaced a definite distance apart which comprises: simultaneously engaging opposite faces of the slab with tools that are spaced apart the desired distance; moving the tools with respect to the slab to cause friction between the tools and the surface portions that come in contact with the tools to generate heat sufficient to soften the material in the surface portions of the slab and insufficient to decompose the material so that the tool may push the softened material into the pores and low spaces on the surface of the slab; and moving the slab with respect to the tool, thereby to generate parallel planar surfaces on the slab.

EDMUND R. ALLER.

REFERENCES CITED

The following references are of record in the file of this patent:

UNITED STATES PATENTS

| Number | Name | Date |
|---|---|---|
| 2,169,315 | Yngve | Aug. 15, 1939 |
| 2,256,483 | Johnston | Sept. 23, 1941 |
| 2,354,243 | Blake | July 25, 1944 |
| 2,371,868 | Berg et al. | Mar. 20, 1945 |

OTHER REFERENCES

Freres, "Fabricating with Frictional Heat," Modern Plastics, November 1945, pages 142–145.